United States Patent [19]
Griggs

[11] 3,952,692
[45] Apr. 27, 1976

[54] TEMPERATURE CHANGE SENSING DEVICE

[76] Inventor: Edwards A. Griggs, 63 W. McClellan Ave., Livingston, N.J. 07039

[22] Filed: July 30, 1975

[21] Appl. No.: 600,411

[52] U.S. Cl. ............................... 116/102; 73/363.7
[51] Int. Cl.² ...................... G08B 7/02; G08B 21/00
[58] Field of Search ............ 116/114 Y, 114 Z, 101, 116/102, 129 S, DIG. 37, 114.5, 67 R, 114 R; 73/363.7, 363.9; 340/227.1; 337/351, 352, 353, 354, 356, 376

[56] References Cited
UNITED STATES PATENTS

| | | | |
|---|---|---|---|
| 2,750,916 | 6/1956 | Hanington | 116/102 |
| 3,140,372 | 7/1964 | Randolph | 337/352 |

*Primary Examiner*—S. Clement Swisher
*Assistant Examiner*—Denis E. Corr
*Attorney, Agent, or Firm*—Kenyon & Kenyon Reilly Carr & Chapin

[57] ABSTRACT

A temperature change sensing device which is adapted to be used in conjuction with an audible or visual warning device, comprising a temperature sensitive means for rotating a first disc, having disposed about its surface at least one of a first cooperative coupling means. These first cooperative coupling means coincide with a second cooperative coupling means located on a second disc. When the ambient temperature reaches the preset temperature of the sensing device, the temperature sensitive means rotates the first disc such that the first cooperative coupling means aligns with the second cooperative coupling means on the second disc. The second disc is then thrust toward the first disc by a biasing means, which has attached to it a means for tripping a visual or audible warning device.

10 Claims, 4 Drawing Figures

U.S. Patent  April 27, 1976  3,952,692
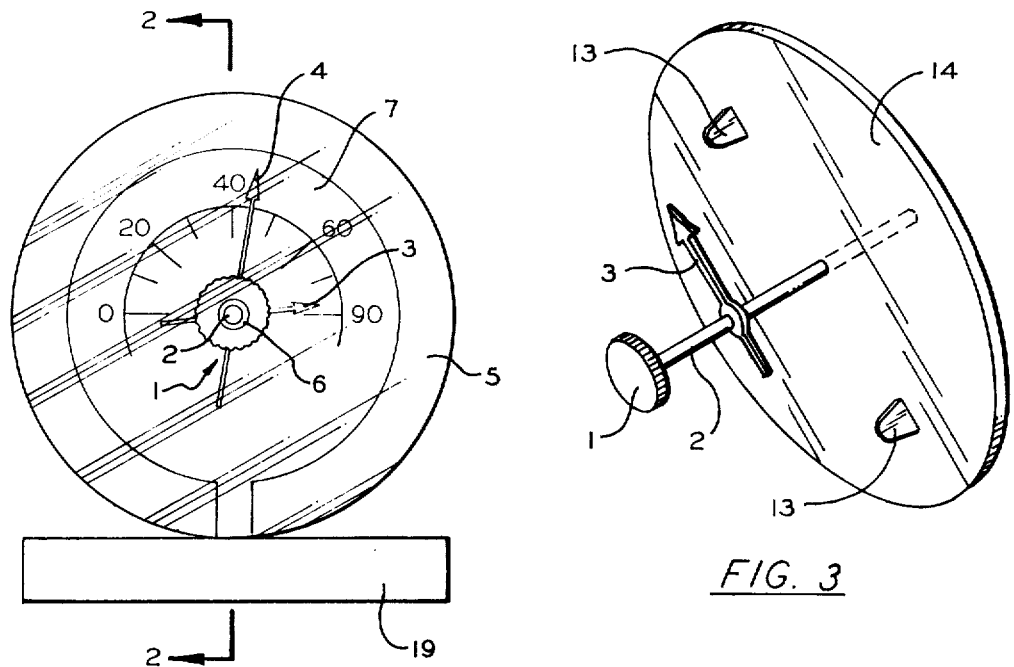
FIG. 1
FIG. 3
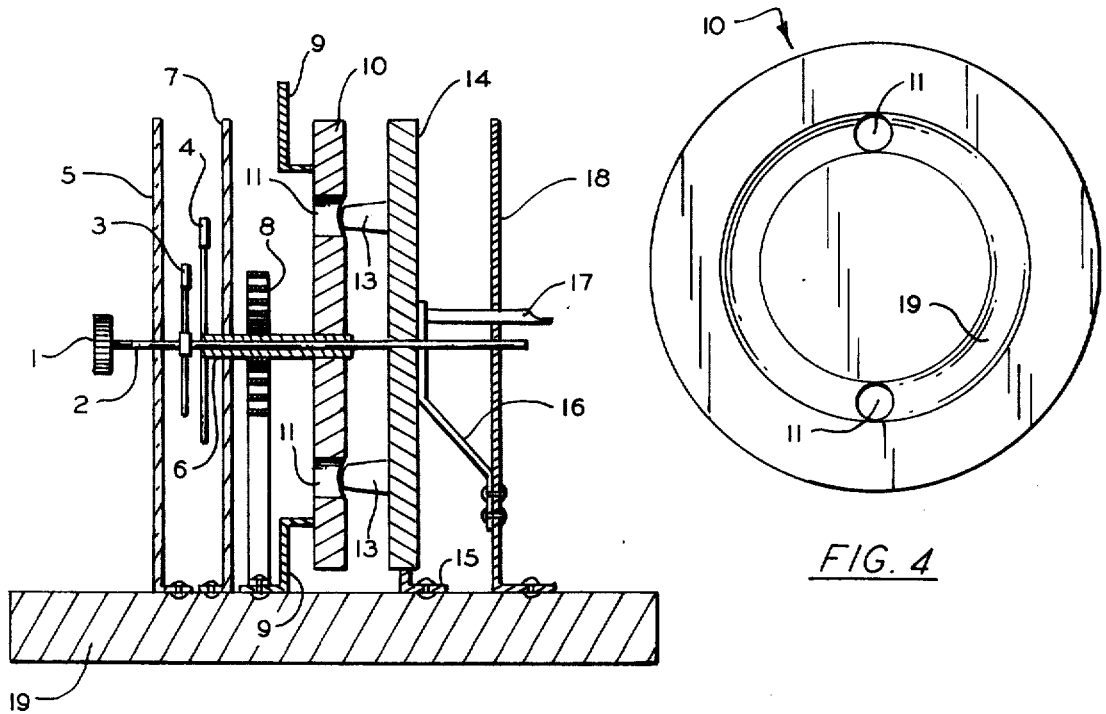
FIG. 2
FIG. 4

TEMPERATURE CHANGE SENSING DEVICE

BACKGROUND OF THE INVENTION

1. Field of the Invention

This invention relates to sensing devices, and more particularly to a mechanical, temperature change sensing device, to be used in the manufacturing of fire alarms and the like.

2. Description of the Prior Art

Prior art sensing devices have in the past fit into essentially two categories, one being electrically energized sensing devices and the other being mechanically energized sensing devices. The electrically energized sensing devices of the prior art have one basic drawback, in that under some conditions an electrically activated sensing device may fail to sound an alarm because of an electrical power failure. Therefore, mechanical sensing devices are highly desirable since they operate completely independent of an electrical power source.

Mechanical sensing devices of the prior art include a number of devices which, although they are independent of an electrical source have a number of considerable disadvantages. For example, many of the prior art devices require that they be mounted in a particular orientation in order for them to function properly. Others contain a fuseing means, which when melted sound an alarm. This fuse, although quite reliable, has the disadvantage of being difficult to replace, and thus testing of the alarm system regularly becomes impractical. Another disadvantage of many of the prior art sensing devices is that they cannot be adjusted, or if they can, adjustment is difficult. Furthermore, many of the sensing devices of the prior art are only capable of sounding an alarm in the event of an increase in temperature, and thus application to a system which must be activated by a decrease in temperature is difficult. A further disadvantage of many of the mechanical prior art sensing devices is that they are simply too complicated, making them expensive to manufacture and buy.

The device of the present invention contemplates a novel mechanical sensing device which obviates many of the disadvantages encountered in the prior art devices. Unlike many of the prior art devices, the sensing device of the present invention is completely mechanical, can be mounted in any position and can be tested regularly without damaging or replacing any of the parts. Furthermore, the device of the present invention can be quickly and conveniently adjusted to sound an alarm at any temperature that may be required, whether this temperature be higher or lower than the prevailing atmospheric temperature.

SUMMARY OF THE INVENTION

The present invention provides for a completely mechanical temperature change sensing device, which is simple in design and construction and thus completely reliable. It comprises a temperature sensitive means mounted fixably to and around a first shaft which is in turn mounted axially to the center of a first disc. This first disc has disposed on its surface at least one of a first cooperative coupling.

Extending through the first disc and the center of the first shaft is a second shaft, to which is attached, a second disc. This second disc has disposed on its surface at least one of a second cooperative coupling. The cooperative couplings maintain a spaced relationship between the first and second disc.

When the ambient temperature changes, the temperature sensitive means causes the first shaft and the first disc to rotate an amount proportional to the temperature change. When the ambient temperature reaches the preset temperature of the sensing device, the cooperative coupling on the first disc aligns itself with the cooperative coupling on the second disc. At this point a biasing spring urges the second disc toward the first disc, whereby means are set in motion to trip an audible or visual alarm.

It is therefore an object of the present invention to provide a temperature change sensing device which is self-contained and independent of auxiliary power.

Another object of the invention is to provide a temperature change sensing device which is simple in design and construction and therefore inexpensive to manufacture.

A further object of the present invention is to provide a temperature change sensing device which can be mounted in any position.

Still another object of the present invention is to provide a temperature change sensing device which will activate an alarm in the event of a change in ambient temperature, whether this change be a raising or lowering of the prevailing temperature.

Still a further object of the present invention is to provide a temperature change sensing device which can be quickly and conveniently set to activate an alarm at a predetermined temperature.

Still other objects and advantages of the present invention will be obvious and in part be apparent from the specification. The invention accordingly comprises the features of construction, a combination of elements and arrangement of parts which will be exemplified in the construction hereinafter set forth and the scope of the invention will be indicated in the claims.

BRIEF DESCRIPTION OF THE DRAWINGS

For a further understanding of the invention reference is had to the following description taken in connection with the accompanying drawings of the preferred embodiment in which:

FIG. 1 is an elevational view of the preferred embodiment of the sensing device.

FIG. 2 is a side view of the preferred embodiment, showing in detail the internal mechanism of the device.

FIG. 3 is a perspective view of the temperature set disc with attached shaft and alarm set hand, showing the position of the prongs relative to the position of the alarm set hand.

FIG. 4 is a rear view of the temperature monitoring disc, showing the apertures and optional guiding channel.

DESCRIPTION OF THE PREFERRED EMBODIMENT

Referring now more particularly to the accompanying drawings wherein like numerals designate similar parts throughout the various views, attention is directed first to FIG. 1 wherein a face view of the preferred embodiment is shown. Reference numeral 5 designates a transparent face plate; located behind this plate is a graduated thermometer scale 7. This graduated thermometer scale 7 is concentrically disposed about the hollow shaft 6 and fixably secured to the base member 19.

Located between the face plate 5 and the graduated temperature scale 7 is an adjustable alarm set indicator hand 3 and a temperature indicator hand 4. The alarm set indicator hand is fixably attached to a solid shaft 2 and indicates, on the graduated temperature scale 7 the temperature to which the sensing device is set. The temperature indicator hand 4 is fixably attached to a hollow shaft 6 and indicates on the graduated temperature scale 7 the prevailing ambient temperature.

Referring to FIG. 2 it can be seen that the solid shaft 2 extends axially through the entire device, it being supported at one end by the face plate 5 and at the other end by a housing support member 18. Fixably mounted at the face end of shaft 2 is a knurled adjustment knob 1. Also fixably mounted to the shaft 2 is the above-mentioned alarm set indicator hand 3 and a temperature set disc 14. This temperature set disc 14 is provided with preferably two prongs 13. These prongs, as shown in FIG. 3 are positioned on the temperature set disc such that they are located on a diameter of the disc and are equidistant from the center. Extending axially and concentrically around a portion of the center shaft 2 is a hollow shaft 6. At the face end of this hollow shaft 6 is fixably mounted the temperature indicator hand 4. At the other end of the shaft 6, also fixably mounted is a temperature monitoring disc 10. This temperature monitoring disc is provided with a plurality of apertures which will engage the prongs 13 on temperature set disc 14 when the two discs are rotated to a position where the apertures 11 and the prongs 13 align. This alignment will normally take place when the ambient temperature coincides with the preset temperature of the sensing device. Until that temperature is reached however, prongs 13 will not engage apertures 11 and thus a space will be maintained between discs 10 and 14.

A bi-metallic thermometer dial spring 8 entwines the hollow shaft 6 and has its inner end fixably attached thereto, the other end being fixably secured to the base member 19. This bi-metallic thermometer dial spring is sensitive to variations in temperature, and converts this variation of temperature to a rotational movement of shaft 6 and its attached components. A rise in temperature will be converted by the bi-metallic spring into a clockwise rotation of shaft 6, temperature monitoring disc 10 and temperature monitoring hand 4. A decrease in temperature will result in a counterclockwise rotation of the shaft 6 and its attached components. It should be noted that the center shaft 2 with its fixably attached components can turn independently of the hollow shaft 6 and its fixably mounted components. During construction of the present invention care must be taken, when mounting the indicator hands 3 and 4 on their respective shafts, that the two hands coincide with each other when the prongs 13 located on the temperature set disc 14 coincide with the apertures 11 located on the temperature monitoring disc 10 (consideration of course being given to the fact that the indicator hands are then positioned opposite the ambient temperature mark on scale 7).

The present invention is also provided with a flat bar spring 16 with attached trip arm 17. This spring 16 biases the temperature set disc 14 against the temperature monitoring disc 10. Brackets 9 prevent the temperature monitoring disc 10 from moving forward from the pressure exerted by the spring 16 through the temperature set disc 14. These brackets do not, however prevent the disc 10 from being rotated by the thermometer spring 8 as the temperature changes.

FIG. 4 depicts the face of the temperature monitoring disc 10 showing the apertures 11 which are positioned to coincide with the prongs 13 of the set disc 14, when the ambient temperature equals the preset temperature of the sensing device. Also shown on the temperature monitoring disc 10 depicted in FIG. 4 is an optional groove 19 which acts as a guide for the prongs 13.

In order to set the sensing device to the temperature at which the alarm is to be activated, knob 1 is pushed in and rotated such that the alarm set indicator hand is at the desired temperature setting. Since disc 14 is fixably connected to shaft 2, it likewise moves inward as knob 1 is pushed. Prongs 13, which may have been engaged with apertures 8, are released therefrom allowing rotation of the knob to the desired setting. If disc 14 is set at a temperature which is either higher or lower than the ambient temperature prongs 13 will not coincide with the apertures 11 and a space will be maintained between discs 10 and 14. As the temperature changes the bi-metallic spring 8 will rotate the shaft 6, the temperature indicator hand 4 and the temperature monitoring disc 10. When the temperature of the surrounding air reaches the preset temperature of the sensing device the two hands 3 and 4 coincide, as do the prongs 13 on the temperature set disc and the apertures 11 on the temperature monitoring disc. When this occurs the bar spring 16 will force the temperature set disc forward. The bar spring and attached trip arm 17 will also move forward. This forward movement of trip arm 17 will set off a visual or audible warning device.

As would be understood by those skilled in the art, any number of prior art warning devices could be used in conjunction with the present invention to sound an alarm. It is preferred however, that the warning device be mechanically operated, so that the warning device in conjunction with the temperature change sensing device of the present invention be completely independent of an electrical power source.

A mechanical warning device well suited for use in conjunction with the sensing device of the present invention is disclosed in U.S. Pat. No. 2,072,523. When adapting the device disclosed therein to the present invention, trip arm 17 of the sensing device should be attached to arm 68 of the warning device, such that the movement of trip arm 17 of the sensing device will pull arm 68 of the warning device forward, releasing it from the retaining member 74 and sounding the alarm.

As shown in FIG. 2 the circumference of the set disc 14 may be provided with a serrated edge. In communication with this serrated edge is a rotary brake 15 which prevents the set disc from inadvertently rotating after it has been set.

It will be obvious to those skilled in the art that the apparatus of the present invention can be constructed of a variety of materials. However it is preferred, for obvious reasons that the material to be used be able to withstand a high degree of temperature without warping or melting. It should also be obvious that the sensing device of the present invention could be built into a variety of different housing members without having a detrimental effect on its ability to function properly.

Since from the foregoing, the construction and advantages of the device may be readily understood, further explanation is believed to be unnecessary.

However, since numerous modifications will readily occur to those skilled in the art after a consideration of the foregoing specification and accompanying drawings, it is not intended that the invention be limited to the exact construction shown and described, but all suitable modifications and equivalents may be resorted to which fall within the scope of the appended claims.

Having described the invention, what is claimed is:

1. A temperature sensing device which comprises:
   a. a first disc having at least one of a first cooperative coupling disposed about the surface thereof;
   b. a second disc having at least one of a second cooperative coupling disposed about its surface;
   c. a first shaft fixably attached to said first disc at its center and extending axially therefrom;
   d. means fixably attached to said first shaft for translating changes in ambient temperature into rotational movement of said shaft;
   e. a second shaft fixably attached to said second disc;
   f. means for rotating said second shaft an amount equal to a desired temperature change, said first and second disc axially disposed and oriented relative to one another such that said first and second cooperative couplings align themselves when said means for translating changes in ambient temperature rotates said first shaft an amount proportional to the desired temperature change;
   g. biasing means for urging said second disc axially towards said first disc when said first and second cooperative couplings are aligned; and
   h. alarm trip means responsive to the movement of said second disc towards said first disc.

2. The device of claim 1 wherein said first cooperative coupling is an aperture and said second cooperative coupling is a prong.

3. The device of claim 1 wherein said first shaft is a hollow shaft and said second shaft extends the axial length of said device and through said hollow shaft and first disc.

4. The device of claim 3 further comprising:
   a. a graduated temperature scale disposed upon a third disc said third disc concentrically disposed about said first shaft and fixably secured relative thereto;
   b. a temperature indicator hand fixably attached to said hollow shaft for indicating the ambient temperature on said graduated temperature scale;
   c. an alarm set indicator hand attached to said second shaft for indicating the temperature, on said graduated temperature scale, at which said temperature sensing device will activate an alarm.

5. The device of claim 1 wherein said first disc is provided with a means for preventing it from movement away from said second disc.

6. The device of claim 1 wherein the second disc is provided with a means for preventing the rotation of said disc after it has been set.

7. The device of claim 1 wherein the biasing means is a flat bar spring.

8. The device of claim 2 wherein said first disc is provided with a guiding channel for guiding said prongs of the second disc.

9. A change in temperature sensing device which comprises:
   a. a first disc having a plurality of apertures disposed about the surface thereof;
   b. a second disc having a plurality of prongs disposed about its surface;
   c. a hollow shaft fixably attached to said first disc at its center and extending axially therefrom;
   d. a bi-metallic dial spring fixably attached to said hollow shaft for translating changes in ambient temperature to rotational movement of said shaft;
   e. a solid shaft fixably attached to said second disc, and extending the axial length of said device, through said hollow shaft and first disc;
   f. means for indicating the ambient temperature, in part connected to said hollow shaft;
   g. means for rotating said second shaft an amount equal to a desired temperature change, said first and second disc axially disposed and oriented relative to one another such that said apertures and prongs align themselves when the bi-metallic dial spring rotates said hollow shaft an amount proportional to the desired temperature change;
   h. biasing means for urging said second disc axially toward said first disc when said apertures and prongs are aligned; and
   i. means responsive to the urging of said second disc towards said first disc for activating an alarm.

10. The device of claim 9 further comprising a rotary brake means for preventing said second disc from rotating after it has been set.

* * * * *